(12) United States Patent  
Nakagomi et al.

(10) Patent No.: US 8,040,947 B2
(45) Date of Patent: Oct. 18, 2011

(54) BITRATE CONTROL DEVICE FOR CONTROLLING BITRATE OF VIDEO DATA

(75) Inventors: Kouichi Nakagomi, Tokorozawa (JP); Kazuhisa Matsunaga, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 529 days.

(21) Appl. No.: 12/277,677

(22) Filed: Nov. 25, 2008

(65) Prior Publication Data

US 2009/0135902 A1    May 28, 2009

(30) Foreign Application Priority Data

Nov. 27, 2007  (JP) .................. P2007-305843

(51) Int. Cl.
*H04N 7/12* (2006.01)
*H04N 11/02* (2006.01)
(52) U.S. Cl. ................. 375/240.02; 375/240.26
(58) Field of Classification Search . 375/240.01–240.29
See application file for complete search history.

(56) References Cited

U.S. PATENT DOCUMENTS

| | | | | |
|---|---|---|---|---|
| 5,963,222 A * | 10/1999 | Cheney et al. | ............... | 345/572 |
| 6,157,674 A * | 12/2000 | Oda et al. | ............... | 375/240 |
| 6,157,740 A * | 12/2000 | Buerkle et al. | ............... | 382/233 |
| 6,229,852 B1 * | 5/2001 | Hoang | ............... | 375/240.25 |
| 6,381,254 B1 * | 4/2002 | Mori et al. | ............... | 370/537 |

FOREIGN PATENT DOCUMENTS

| | | |
|---|---|---|
| JP | 10-004546 A | 1/1998 |
| JP | 2004-015351 A | 1/2004 |
| JP | 2004-297266 A | 10/2004 |
| JP | 2007-158944 A | 6/2007 |

OTHER PUBLICATIONS

Japanese Office Action dated Dec. 8, 2009 and English translation thereof issued in a counterpart Japanese Application No. 2007-305843.

* cited by examiner

*Primary Examiner* — David Czekaj
(74) *Attorney, Agent, or Firm* — Holtz, Holtz, Goodman & Chick, P.C.

(57) ABSTRACT

A bitrate control device controls bitrate of video data and includes: a setting module that sets, for each frame in the video data, a target code amount to be used in encoding the frame by an encoding module for maintaining a given bitrate; an adjusting module that adjusts the target code amount set by the setting module based on given information; and a managing module that is configured to perform: saving a code amount corresponding to an amount reduced in the target code amount by the adjusting module in a virtual storage management buffer having a given upper limit, when the adjusting module adjusts to reduce the target code amount; and withdrawing a code amount corresponding to an amount increased in the target code amount by the adjusting module from the virtual storage management buffer, when the adjusting module adjusts to increase the target code amount.

16 Claims, 8 Drawing Sheets

BITRATE CONTROL DEVICE FOR CONTROLLING BITRATE OF VIDEO DATA

CROSS-REFERENCE TO THE RELATED APPLICATION(S)

The present application is based upon and claims priority from prior Japanese Patent Application No. 2007-305843, filed on Nov. 27, 2007, the entire content of which are incorporated herein by reference.

TECHNICAL FIELD

The present invention relates to a bitrate control device, a method for controlling code amount of video data, a computer-readable recording medium stored with a code amount control program, and a digital video recorder.

BACKGROUND

As conventional bitrate control methods that are used in compressing and recording a video image in a digital video recorder, CBR (constant bitrate) and VBR (variable bitrate) are known. In CBR, a code amount (the number of bits) per time segment is controlled so as to be constant. In VBR, the code amount per time segment is variably controlled. Usage of VBR improves the image quality of a video image without unduly increasing storage space for storing the video data by allocating larger code amounts to pictures of rapidly varying portions in the video image and having large information amounts, and allocating smaller code amounts to pictures having small information amounts.

SUMMARY

According to a first aspect of the invention, there is provided a bitrate control device for controlling bitrate of video data, the device including: a setting module that sets, for each frame in the video data, a target code amount to be used in encoding the frame by an encoding module for maintaining a given bitrate; an adjusting module that adjusts the target code amount set by the setting module based on given information; and a managing module that is configured to perform: saving a code amount corresponding to an amount reduced in the target code amount by the adjusting module in a virtual storage management buffer having a given upper limit, when the adjusting module adjusts to reduce the target code amount; and withdrawing a code amount corresponding to an amount increased in the target code amount by the adjusting module from the virtual storage management buffer, when the adjusting module adjusts to increase the target code amount.

According to a second aspect of the invention, there is provided a method for controlling a bitrate of video data, the method including: setting, for each frame in the video data, a target code amount to be used in encoding the frame by an encoding module for maintaining a given bitrate; performing an adjustment on the target code amount based on given information; saving a code amount corresponding to an amount reduced in the target code amount by the adjustment in a virtual storage management buffer having a given upper limit, when the adjustment is performed to reduce the target code amount; and withdrawing a code amount corresponding to an amount increased in the target code amount by the adjustment from the virtual storage management buffer, when the adjustment is performed to increase the target code amount.

According to a third aspect of the invention, there is provided a computer-readable storage medium containing a sequence of instructions for a program executable by a computer system, the program including: instructions for setting, for each frame in the video data, a target code amount to be used in encoding the frame by an encoding module for maintaining a given bitrate; instructions for performing an adjustment on the target code amount based on given information; instructions for saving a code amount corresponding to an amount reduced in the target code amount by the adjustment in a virtual storage management buffer having a given upper limit, when the adjustment is performed to reduce the target code amount; and instructions for withdrawing a code amount corresponding to an amount increased in the target code amount by the adjustment from the virtual storage management buffer, when the adjustment is performed to increase the target code amount.

According to a fourth aspect of the invention, there is provided a digital video recorder including: an imaging module that captures a video image and outputs video data; an encoding module that encodes each frame in the video data with a given encoding scheme having a target code amount used for maintaining a given bitrate; a setting module that sets, for each frame in the video data, the target code amount; an adjusting module that adjusts the target code amount set by the setting module based on given information; and a managing module that is configured to perform: saving a code amount corresponding to an amount reduced in the target code amount by the adjusting module in a virtual storage management buffer having a given upper limit, when the adjusting module adjusts to reduce the target code amount; and withdrawing a code amount corresponding to an amount increased in the target code amount by the adjusting module from the virtual storage management buffer, when the adjusting module adjusts to increase the target code amount.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION

Figure 1:
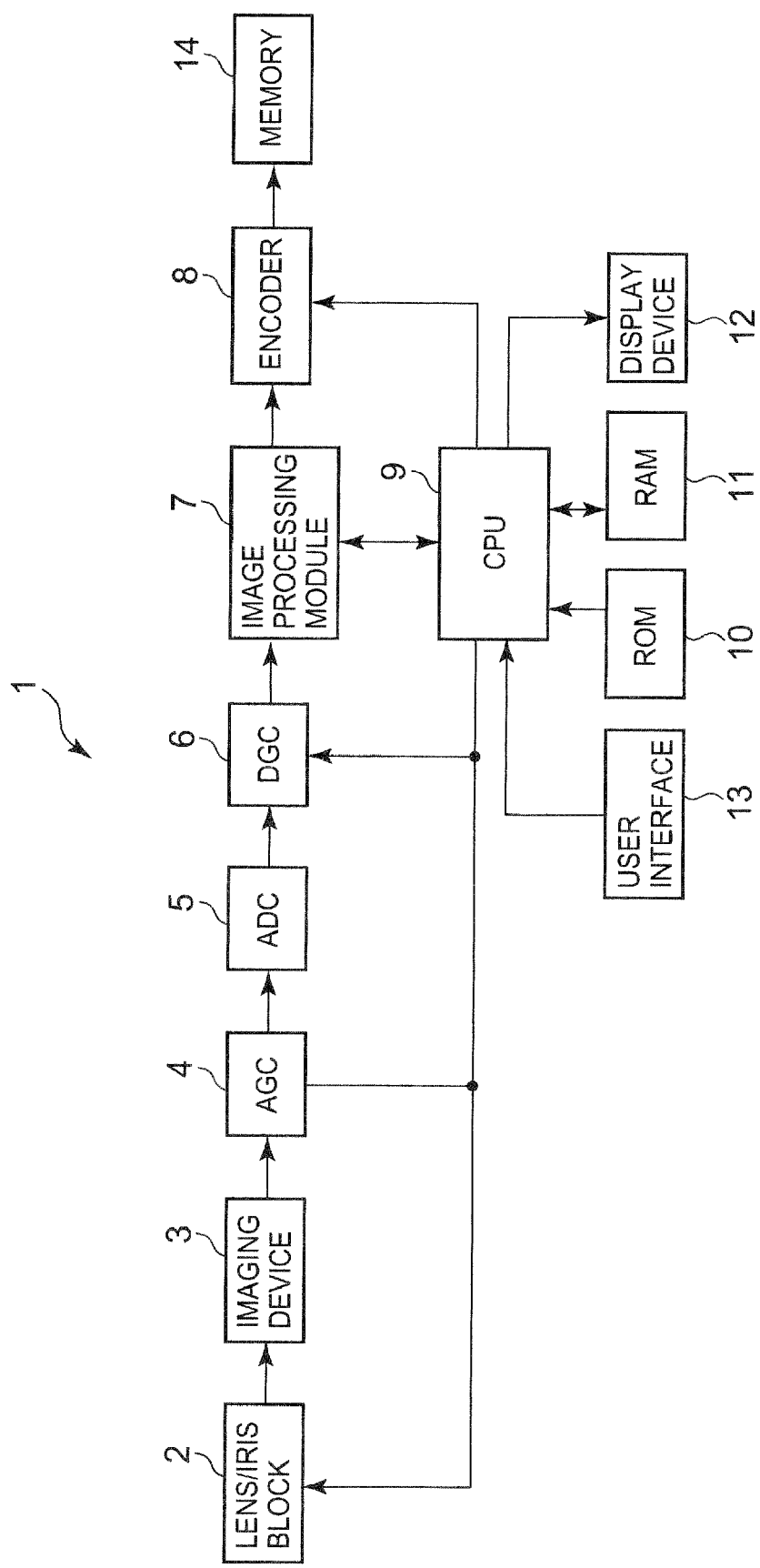
FIG. 1 is a block diagram of a digital video camera according to an embodiment of the present invention.

An embodiment according to the present invention will be described in detail with reference to the accompanying drawings. The scope of the claimed invention should not be limited to the examples illustrated in the drawings and those described in below.

FIG. 1 shows a configuration of a digital video camera 1 employed with a bitrate control device according to the invention. The digital video camera 1 is an apparatus for encoding video data obtained by capturing an image and storing the encoded video data in a memory 14 (storage device).

As shown in FIG. 1, the digital video camera 1 is provided with a lens/iris block 2 an imaging device 3, an analogue gain controller (AGC) 4, an A/D converter (ADC) 5, a digital gain controller (DGC) 6, an image processing module 7, an encoder 8, a processor 9, a ROM 10, a RAM 11, a display device 12, a user interface 13, and a memory 14.

The lens/iris block 2 is provided with: a lens group including a zoom lens and a focusing lens; a zoom mechanism and a focusing mechanism for activating the lens group; and an iris (aperture) mechanism. Each of the mechanisms operates by being controlled by the processor 9. An optical image taken through the lens/iris block 2 is focused on the imaging device 3, which is configured by a CCD or a CMOS sensor.

The imaging device 3 photoelectrically converts the optical image into an image signal at a given frame rate and outputs the image signal to the AGC 4. The AGC 4 adjusts the gain of the received image signal by being controlled by the processor 9 and outputs a resulting image signal to the ADC 5. The ADC 5 converts the received image signal into digital image data and outputs the digital image data to the DGC 6. The DGC 6 adjusts the gain of the received image data for each frame by being controlled by the processor 9 and outputs resulting image data to the image processing module 7.

The image processing module 7 performs various image processing such as gamma correction on the received gain-adjusted image data (e.g., Bayer data), generation of R, G, and B color component data for each pixels, and YUV conversion from the generated RGB data into YUV data. The image processing module 7 outputs the YUV data to the encoder 8 and the processor 9. In the embodiment, components including the lens/iris block 2, the imaging device 3, the AGC 4, the ADC 5, the DGC 6, and the image processing module 7 serve as an imaging module that captures an image and generates image data for each of frames of the video data.

The encoder 8, which serves as an encoding module, generates encoded video data by sequentially encoding and compressing the YUV data (hereinafter simply referred to as image data) that is output from the image processing module 7 according to an encoding scheme that conforms to the MPEG standards that uses a motion-compensated interframe prediction technique. Although not shown in FIG. 1, the encoder 8 is provided with an orthogonal transformation circuit, a quantization circuit, a motion detection circuit, a forward prediction circuit, an encoding circuit, a decoding circuit, an inverse orthogonal transformation circuit, and a frame memory, and encodes a series of image data, which configure the video image, into I pictures (intra-coded pictures), P pictures (predictive-coded pictures), and B pictures (bidirectionally predictive-coded pictures).

The coded image data generated by the encoder 8 is recorded in the memory 14 according to an instruction output from the processor 9. The details of an encoding/compressing process which is performed on image data by the encoder 8 will be described later in detail.

The ROM 10, the RAM 11, the display device 12, and the user interface 13 are connected to the processor 9. The display device 12 is provided with an LCD panel and an LCD controller. The image data that has been input to the processor 9 is sent to the display device 12, converted into a video signal by the LCD controller, and displayed on the LCD panel as an image. The user interface 13 is provided with various buttons, such as a zoom key for receiving user's commands. The digital video camera 1 according to the embodiment is configured in such a manner that the zooming speed can be switched automatically from a low speed to a high speed by operating the zoom key continuously for more than a given time.

The processor 9 controls other components of the digital video camera 1 by running various programs, which includes a code amount control program, stored in the ROM 10 using the RAM 11 as a work memory. In capturing a video image, the processor 9 performs automatic exposure correction (AE) which includes adjustments of the iris opening degree and the gains of the AGC 4 and the DGC 6, contrast detection type automatic focus adjustment (AF) in which the position of the focusing lens is adjusted on the basis of image data, and automatic white balance adjustment (AWB) in which the ratio among the color components of YUV data generated by the image processing module 7 is adjusted.

The AE control which is performed by the processor 9 in capturing a video image will be described below. The digital video camera 1 is provided with plural photometry modes such as average photometry, center-weighted photometry, spot photometry, and multi-pattern photometry. The digital video camera 1 is configured in a manner to allow a user to select a desired one from these photometry modes in capturing a video image. In performing an AE control in capturing a video image, first, the processor 9 sets one or plural evaluation areas according to a selected photometry mode in each of images taken sequentially and acquires an exposure evaluation value from average luminance information of the area(s). Processing of adjusting the next exposure target value so as to decrease the difference between the exposure evaluation value of a current image acquired and a final target exposure value is performed repeatedly. The exposure evaluation value is thus caused to converge on the final target exposure value and proper exposure is secured.

The next exposure target value is adjusted according to the following equation.

(Next exposure target value)=(Exposure evaluation value of current image acquired)×$Ek$ $Ek$: exposure correction coefficient For example, where the final target exposure value is smaller than the exposure evaluation value of the current image acquired, if the difference between them is large, the exposure correction coefficient $Ek$ is set at a small value (e.g., 0.90) so that the exposure adjustment is performed drastically and the exposure evaluation value approaches the final target exposure value quickly. Conversely, if the difference between them is small, the exposure correction coefficient $Ek$ is set at a large value (e.g., 0.99) and the exposure adjustment width is set small so as to avoid divergence.

The processor 9 operates according to the code amount control program in capturing a video image, and thereby serves as a setting module, an adjusting module (including a determination module, a correction coefficient setting module, a limiting module, and an upper limit setting module), a managing module, and a prohibiting module. The processor 9 performs code amount control when the encoder 8 performs coding/compressing image data.

The code amount control will be outlined in the following description. The processor 9, which basically employs a CBR-type control (hereinafter referred to as "CBR control"), determines, on a frame-by-frame basis, target code amounts that make the bitrate constant, and performs control of increasing or decreasing the target code amounts under predetermined conditions as appropriate.

The CBR control that the processor 9 employs as a basic control is a control that follows the following steps 1, 2, and 3 of MPEG-2 Test Model 5 (hereinafter abbreviated as TM5).

Step 1: Determination of Target Code Amounts of Respective Pictures

Before coding of image data for each frame, the degrees of complexity Xi, Xp, and Xb of I, P, and B pictures which are defined by the following equations are updated.

$$Xi = Si \times Qi$$

$$Xp = Sp \times Qp$$

$$Xb = Sb \times Qb$$

Si: I picture generated code amount
Sp: P picture generated code amount
Sb: B picture generated code amount
Qi: average quantization parameter at the time of I picture coding
Qp: average quantization parameter at the time of P picture coding
Qb: average quantization parameter at the time of B picture coding Each of the degrees of complexity Xi, Xp, and Xb is high for a picture that causes a large coded information amount, and is low for a picture that causes a small coded information amount.

Therefore, each of the degrees of complexity serves as an index that roughly indicates an information amount for the type of a picture that is to be coded. However, the degrees of complexity are obtained by coding pictures actually.

Initial values (init) at a start of coding is calculated according to the following equations.

$$Xi(\text{init}) = 160 \times (\text{bitrate})/115$$

$$Xp(\text{init}) = 60 \times (\text{bitrate})/115$$

$$Xb(\text{init}) = 42 \times (\text{bitrate})/115$$

Bitrate: bits per second (bps)

The numbers Ti, Tp, and Tb of target number of bits (target code amount) of pictures in a GOP (group of pictures) that are to be coded are calculated according to the following equations.

$$Ti = \text{Rest}/\{1 + NpXp/(XiKp) + NbXb/(XiKb)\}$$

$$Tp = \text{Rest}/\{Np + NbKpXb/(KbXp)\}$$

$$Tb = \text{Rest}/\{Nb + NpKbXp/(KpXb)\}$$

Kp: adjustment coefficient, Kp=1.0
Kb: adjustment coefficient, Kb=14
Np: number of uncoded pictures (P pictures) in the GOP
Nb: number of uncoded pictures (B pictures) in the GOP
Rest: number of residual bits that are assigned to the GOP Each of the numbers Ti, Tp, and Tb of target bits is a value obtained by dividing the number of residual bits of the GOP (hereinafter referred to as "Rest") by the number of residual pictures as converted into the number of pictures of the type concerned. That is, it indicates the number of bits (target code amount) that can be assigned to one frame in the case where it is assumed that all encoded pictures in the GOP are pictures of the type concerned that are going to be coded.

Step 2: Calculation of a Quantization Step in the Frame

QP (quantization parameter) is controlled on an MB-by-MB basis (MB: macroblock) based on differences between the target code amount Ti, Tp, or Tb for the picture that is to be coded and the amounts of actually generated codes of respective MBs.

QP is set large (the generated code amount is reduced by increasing the quantization step) if the amount of actually generated codes is larger than the target amount.

QP is set small if the amount of actually generated codes is smaller than the target amount.

Before coding of a j-th MB, the degrees of occupancy of virtual buffers for I frames, P frames, and B frames are calculated according to the following equations.

$$di(j) = di(0) + B(j-1) - Ti \times (j-1)/MB\text{-cnt}$$

$$dp(j) = dp(0) + B(j-1) - Tp \times (j-1)/MB\text{-cnt}$$

$$db(j) = db(0) + B(j-1) - Tb \times (j-1)/MB\text{-cnt}$$

B(j): sum of the amounts of actually generated codes of coded MBs
MB-cnt: number of MBs in the picture
di(0): degree of buffer occupancy of the preceding coded I picture
dp(0): degree of buffer occupancy of the preceding coded P picture
db(0): degree of buffer occupancy of the preceding coded B picture QP of macroblock j is calculated according to the following equation:

$$QP(j) = d(j) \times 51/r$$

r: reaction parameter (=2×(bitrate)/(picture rate))

Parameters di(0), dp(0), and db(0) at the start of coding are calculated according to the following equations:

$$di(0) = 10 \times r/31$$

$$dp(0) = Kp \times di(0)$$

$$db(0) = Kb \times di(0)$$

Step 3: Activity Control

The average value of QP is varied according to activities of respective MBs. To calculate a spatial activity act(j) of macroblock j, a variance is calculated according to the following equation by using pixel values of each luminance block (four luminance blocks are included in each MB) of the input picture.

$$\text{var\_sblk} = \tfrac{1}{64} \cdot \Sigma (Pk - P(\text{ave}))^2 \ (k=1\sim64)$$

var_sblk: variance
Pk: pixel value of a 8×8 block
P(ave): average value of the pixel values of the 8×8 block An activity act(j) is calculated according to the following equation.

$$\text{act}(j) = 1 + \min(\text{var\_sblk})$$

The minimum value min( ) is selected to perform fine quantization even in the case where only part of the macroblock is high in flatness. A coefficient Nact(j) which is normalized in a range of 0.5 to 2 according to a deviation from an average activity is calculated according to the following equation.

$$\text{Nact}(j) = (2 \times \text{act}(j) + \text{avg-act})/(\text{act}(j) + 2 \times \text{avg-act})$$

avg-act: average value of act(j)'s of the picture of the immediately preceding time point (initial value: 400)

A final quantization step is calculated according to the following equation by using the normalized coefficient Nact(j).

$$Mq(j)=Q(j) \times Nact(j)$$

A low-activity portion (flat portion) which is sensitive to noise in terms of the visual characteristics is given a small quantization step.

A high-activity portion (non-flat portion) which is insensitive to noise in terms of the visual characteristics is given a large quantization step.

Coding in which the visual characteristics are taken into consideration is thus performed. A rapidly varying portion where noise is less noticeable is given a large quantization step.

In the embodiment, first, the processor 9 minimizes the code amounts of I pictures by performing the following pieces of processing A-1, A-2, and A-3 parallel with the above-described basic code amount control of the above-mentioned TM5 method.

A-1: Setting an Upper Limit for Target Code Amounts (Target Numbers of Bits) for I Pictures In the above-mentioned TM5 method, if a state without image movement such as subject movement and camera movement continues, the proportion of I pictures becomes much higher than the proportions of P pictures and B pictures. Therefore, when after large code amounts are assigned to I pictures the image information amount is increased due to a pan, a tilt, zooming, or the like in coding of ensuing P and B pictures, the picture quality is deteriorated to a large extent due to insufficient code amounts. In view of this, a sufficient code amount is left by limiting the target code amounts of I pictures to such a level that no breathing problem will occur, whereby picture quality deterioration of ensuing P and B pictures is prevented. The breathing is a breathing phenomenon that is more remarkable when the difference between image information amounts of adjacent frames is larger. Breathing occurs when a large picture-type-dependent difference exists or average QPs of pictures have a large difference.

A-2: Decreasing Target Code Amounts Ti for I Pictures at the Time of a Pan, a Tilt, or Zooming High-frequency components disappear from pictures themselves when a pan or a tilt is done at a speed that is higher than a certain value. Therefore, no breathing occurs even if the ratio of allocation to I pictures is decreased. A sufficient code amount is left by reducing the amounts of codes assigned to I pictures, whereby later image deterioration is prevented.

A-3: Varying the Target Code Amount Ti for an I Picture According to the Luminance During an AE Operation Performed after White Saturation It is meaningless to assign large code amounts to I pictures of an image that is in a white saturation state. Therefore, if white saturation occurs, a sufficient code amount is left by decreasing the target code amount according to the luminance, whereby later image deterioration is prevented. However, during a recovery from a white saturation state, the code amount assigned to an I picture is increased gradually according to the manner of recovery (determined on the basis of the luminance Y).

Furthermore, as appropriate, the processor 9 increases or decrease the code amounts of P pictures and B pictures while keeping the bitrate of a GOP approximately constant by performing the following pieces of processing B-1, B-2, B-3, B-4, B-5, and B-6.

B-1: Increasing the Target Code Amount

Whether a picture that is to be coded will be deteriorated is predicted on the basis of camera parameters (capturing conditions) of the digital video camera 1, a control state of the camera 1 itself, a coding state of the preceding frame, etc. If it is predicted that the picture will be deteriorated, the frame concerned is coded with its target code amount set large in advance.

B-2: Decreasing the Target Code Amount

Whether a picture that is to be coded will have a small information amount is predicted on the basis of camera parameters (capturing conditions) of the digital video camera 1, a control state of the camera 1 itself, a coding state of the preceding frame, etc. If it is predicted that the picture will have a small information amount, the frame concerned is coded with its target code amount set small in advance.

B-3: Saving

If it is found after completion of coding of a given frame that a generated code amount is smaller than the target code amount, a surplus code amount is added to the storage code amount of a storage management buffer (described later).

B-4: Withdrawal

If it is found after completion of coding of a given frame that the target code amount was set too small, that code amount is withdrawn from the storage code amount of the storage management buffer.

B-5: Setting an Upper Limit for the Storage Code Amount

An upper limit is set for the storage code amount of the storage management buffer. If the upper limit is exceeded, the saving of the above processing B-3 is prohibited.

B-6: Restricting the Increase of the Target Code Amount

The increase of the target code amount of the above processing B-1 is restricted to a case that a code amount that is larger than an intended increase is stored in the storage management buffer.

Figure 2:
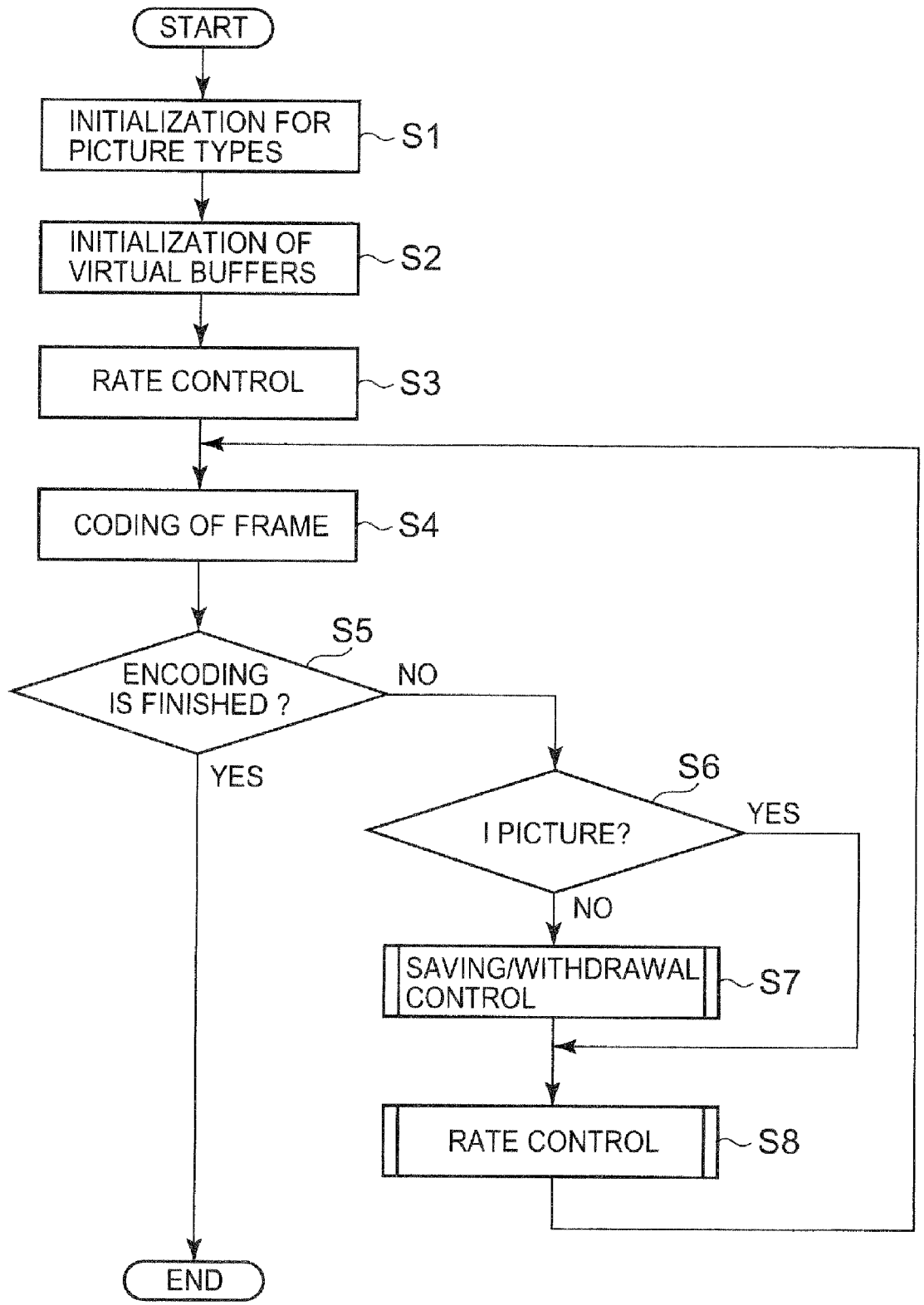
FIG. 2 is a flowchart showing a detail of a code amount control process which is performed by a processor.

Next, the details of a code amount control according to the embodiment will be described with reference to the drawings. FIG. 2 is a flowchart showing the details of a process that is performed by the processor 9 in coding and compressing a video image consisting of a series of picture data when it is captured. In the following description, it is assumed that each GOP consists of 30 pictures and only the head picture of the GOP is an I picture.

In coding and compressing image data, first, at step S1, the processor 9 performs initialization processing for picture types (I picture, P picture, and B picture) by executing step 1 of TM5; that is, the processor 9 sets an initial value of the code amount ratio and determines target code amounts. At step S2, the processor 9 initializes the virtual buffers for macroblock control by executing step 2 of TM5.

At step S3, the processor 9 performs a rate control for calculating frame-by-frame target code amounts according to the initial values that were set at step S1 and S2. At step S4, the processor 9 causes the encoder 8 to perform coding processing on the first-frame picture (I picture) using the calculated target code amount for the first frame.

Figure 3:
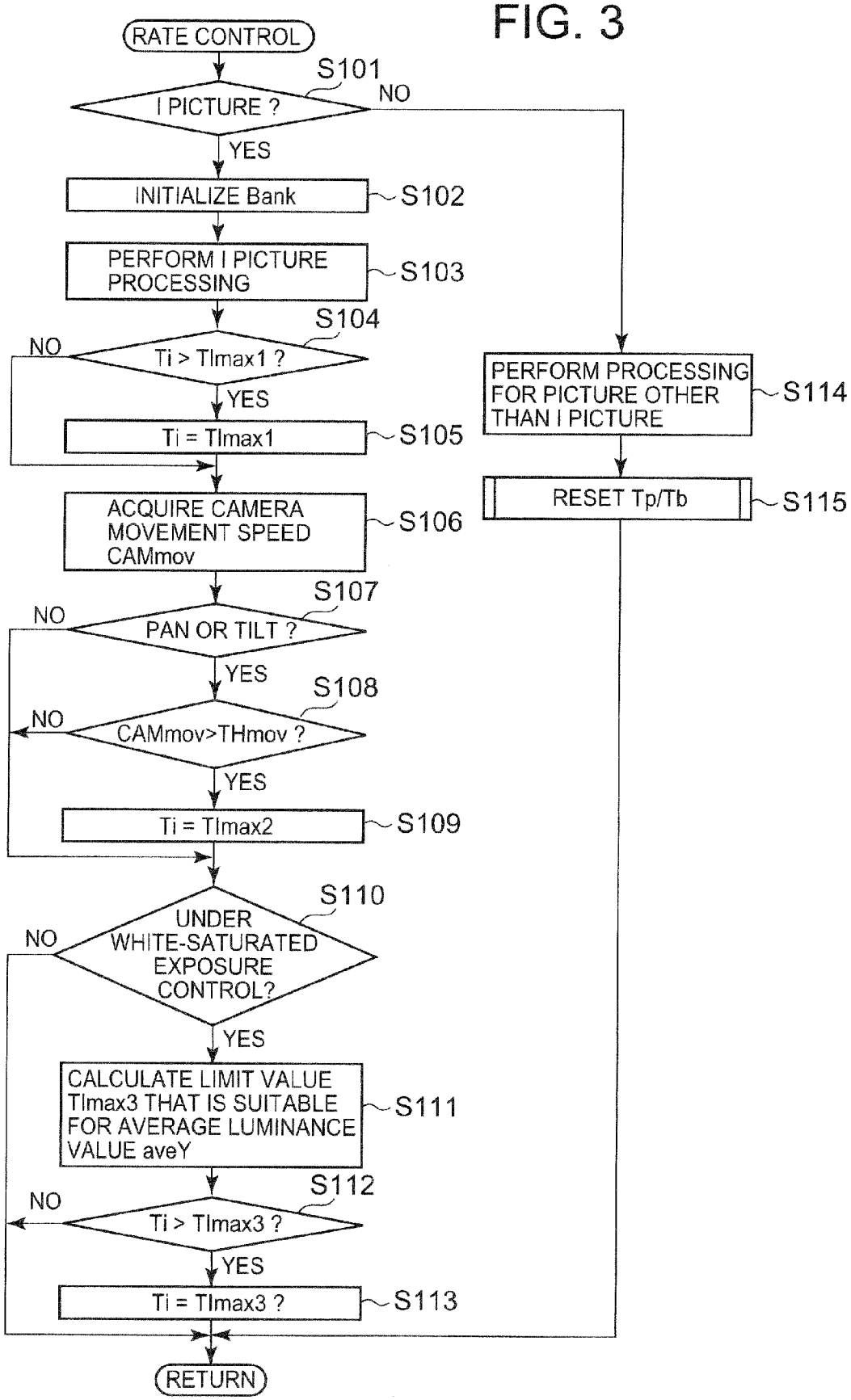
FIG. 3 is a flowchart of a rate control process.
Figure 5:
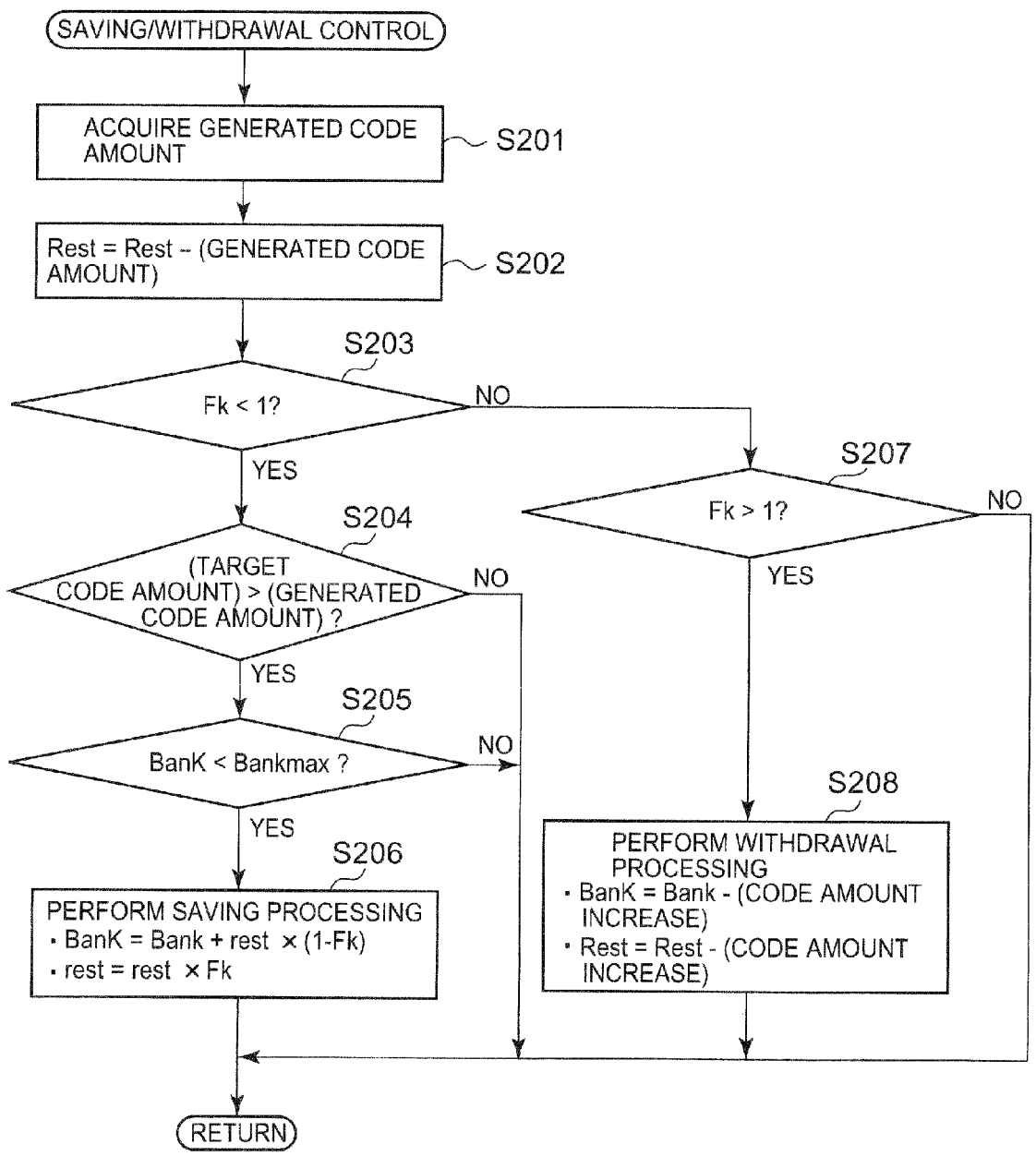
FIG. 5 is a flowchart of a saving/withdrawal control process.

Then, unless the coding should be finished because of, for example, a user's instruction to finish the recording or absence of a free storage capacity in the memory 14 (step S5: no), if the picture that is to be coded is an I picture (step S6: yes), at step S8 the processor 9 performs a rate control shown in FIG. 3 which is different from the above-described rate control of step S3. Then, at step S4, the processor 9 causes the encoder 8 to perform coding processing on the next frame. If the picture that is to be coded is not an I picture, that is, it is a P picture or a B picture (step S6: no), a saving/withdrawal control shown in FIG. 5 is performed at step S7 and the rate control shown in FIG. 3 is performed at step S8. Then, at step S4, the processor 9 causes the encoder 8 to perform coding processing on the next frame. Steps S4-S8 are thereafter performed repeatedly.

Next, the rate control of step S8 will be described with reference to the flowchart of FIG. 3. In this rate control, first, at step S101, it is determined whether the picture that is to be coded is an I picture (i.e., the head picture of the GOP). This determination is made by counting the number of input frames. This also applies to the above-described step S6.

If the picture that is to be coded is an I picture (step S101: yes), at step S102, the processor 9 initializes the storage code amount (Bank) of the virtual storage management buffer to make the virtual storage management buffer empty (Bank=0). At step S103, according to steps 1 and 2 of TM5, the processor 9 performs I picture processing such as calculation of a target code amount Ti for the I picture, setting of a virtual buffer value to be used in TM5, and update of the degree of complexity Xi while keeping a target code amount of the GOP constant.

Figure 9:
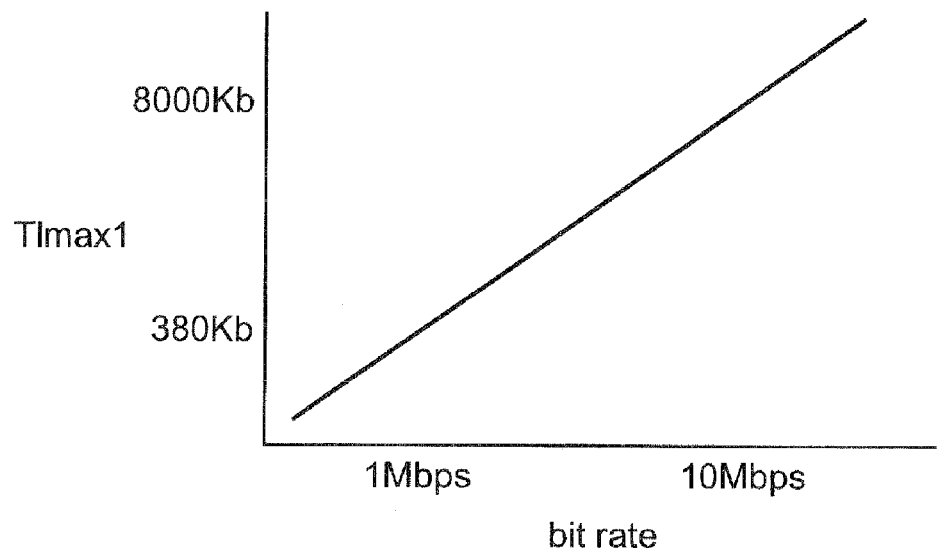
FIG. 9 is graph showing how a first limit value of a rate control is varied with the transfer bitrate.

Then, as appropriate, the processor 9 resets the target code amount Ti to obtain a target code amount to be used actually in coding the I picture, according to the following procedure. First, if the target code amount Ti that was calculated at step S103 exceeds a predetermined first limit value Tlmax1 (step S104: yes), at step S105 the processor 9 sets the target code amount Ti to the first limit value Tlmax1, that is, performs the processing A-1 that was described in the above general description of the code amount control. In the embodiment, the first limit value Tlmax1 depends on a transfer rate that corresponds to image quality that was set at the start of the recording. For example, the first limit value Tlmax1 is set at 380 kb if the transfer rate corresponding to the image quality is 1.3 Mbps, and set at 500 kb if the transfer rate corresponding to the image quality is 2.5 Mbps. In a configuration in which the transfer bitrate (image quality) is not fixed, the first limit value Tlmax1 may be increased in proportion to the transfer bitrate as shown in FIG. 9, for example.

At step S106, the processor 9 acquires a camera movement speed CAMmov on the basis of a motion vector that was obtained when the immediately preceding frame was coded. At step S107, the processor 9 determines on the basis of the movement speed CAMmov whether a pan or tilt was being done at the time of capturing of the frame concerned. If a pan or tilt was being done and the movement speed CAMmov is higher than a given threshold value THmov (steps S107 and S108: yes), it can be determined that the picture lacks high-frequency components. Therefore, at step S109, to obtain a target code amount to be used actually, the processor 9 resets the target code amount Ti to a second limit value Tlmax2 (e.g., 150 kb) which is smaller than the first limit value Tlmax1. That is, the processor 9 performs the above-described processing A-2.

Alternatively, if a pan or tilt was being done at the time of capturing of the immediately preceding frame, at step S108 the processor 9 may calculate a second limit value Tlmax2 according to, for example, the following equation.

$$Tlmax2 = Kmov/CAMmov$$

Kmov: fixed coefficient

The processor 9 resets the target code amount Ti to this second limit value Tlmax2 to obtain a target code amount to be used actually.

Subsequently, at step S110, the processor 9 determines whether a white-saturated exposure control was being done at the capturing of the frame concerned. This determination is made by checking whether the exposure evaluation value of the acquired picture was larger than the final target exposure value and a control for reducing the exposure value was performed at the time of the immediately preceding AE control and an average luminance value aveY of all pixels is larger than or equal to a given value 115.

If a white-saturated exposure control was being done (step S110: yes), at step S111 the processor 9 calculates a third limit value Tlmax3 which is suitable for the average luminance value aveY of all pixels of the frame concerned according to the following equation.

$$Tlmax3 = \{aveY \times (-2.35) + 650\} \times 1000$$

Figure 6:
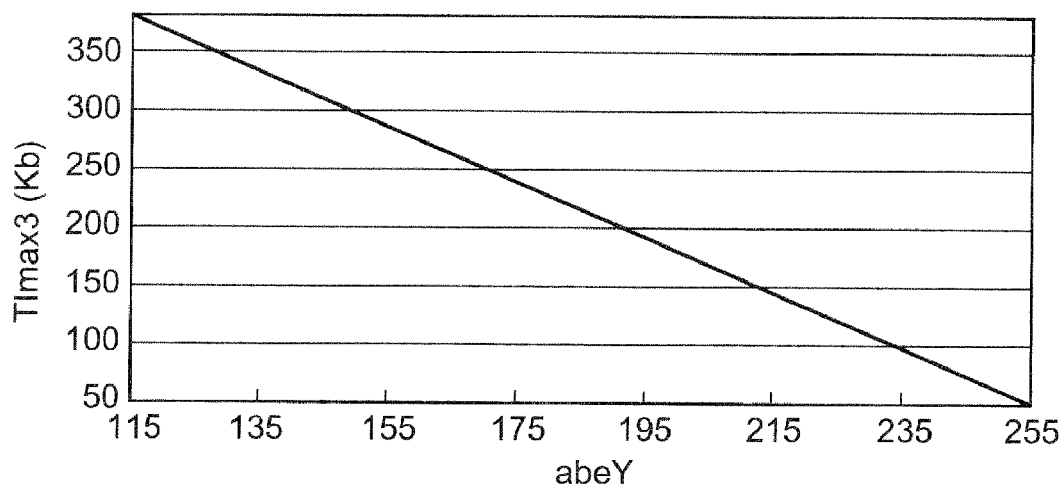
FIG. 6 is a graph showing a relationship between a third limit value and an average luminance value.

FIG. 6 is a graph showing how the third limit value Tlmax3 varies with respect to the average luminance value aveY according to this equation.

If the target code amount Ti currently set is larger than the third limit value Tlmax3 (step S112: yes), at step S113 the processor 9 resets the target code amount Ti to the third limit value Tlmax3 to obtain a mode amount to be used actually, that is, performs the above-described processing A-3.

The target code amount for the I picture is limited to a small value in such a range that no breathing problem will occur by executing the above steps S104-S103, whereby the ratios of code amount allocation to the ensuing P and B pictures in the GOP are increased.

On the other hand, if the determination result of step S101 is "no," that is, the picture that is to be coded is a P picture or a B picture, at step S114 the processor 9 performs, according to steps 1 and 2 of TM5, processing for a picture that is not an I picture such as calculation of a target code amount for the picture according to a residual target code amount Pest for the GOP, setting of a virtual buffer value, and update of the degrees of complexity Xp and Xb.

Figure 4:
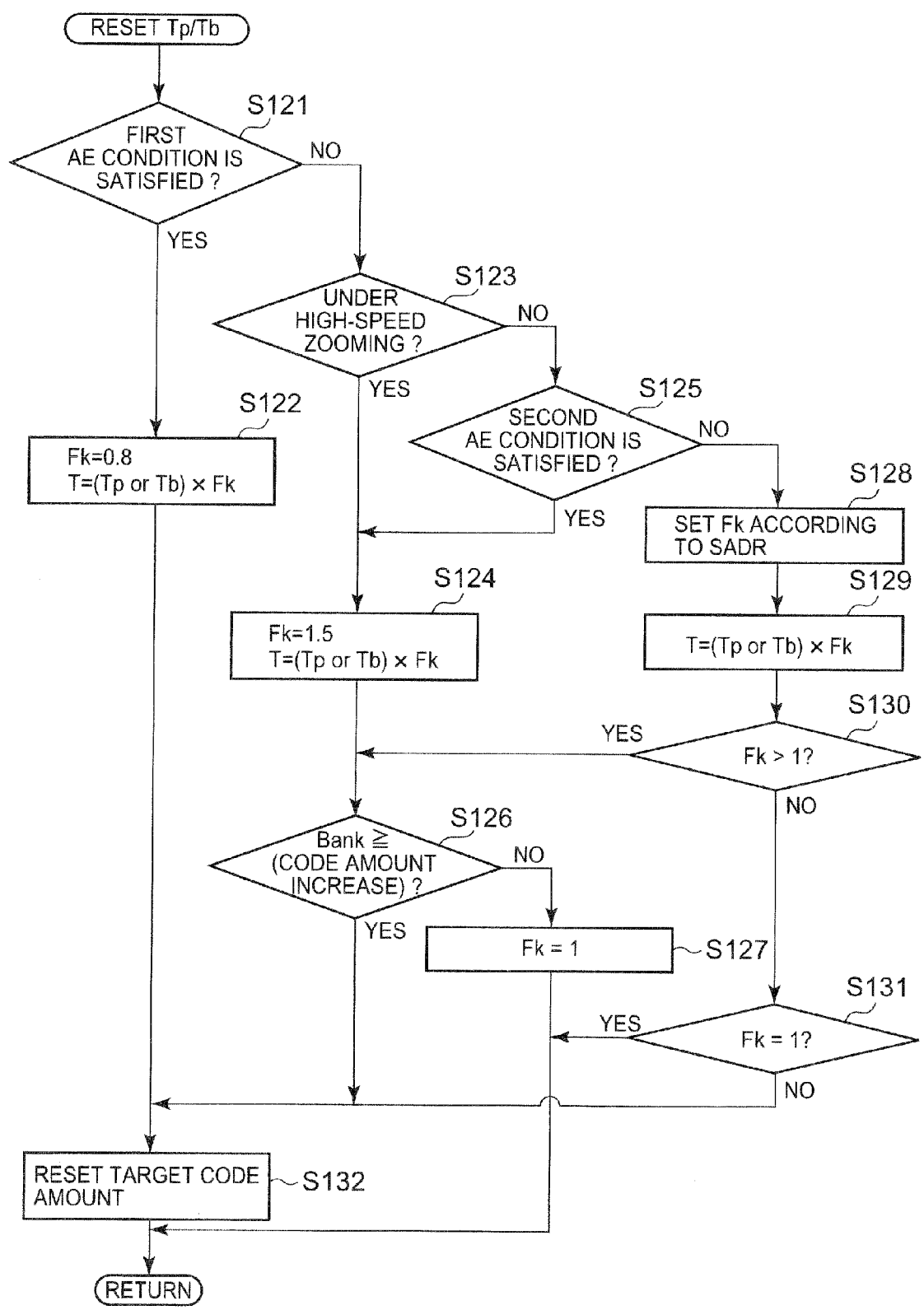
FIG. 4 is a flowchart of a Tp/Tb resetting process.

At step S115, the processor 9 executes a Tp/Tb resetting process for resetting a target code amount Tp or Tb to obtain a code amount to be used actually in coding the P picture or B picture. FIG. 4 is a flowchart showing the details of the Tp/Tb resetting process.

In the Tp/Tb resetting process, first, at step S121, the processor 9 determines whether the frame concerned satisfies first AE conditions. In the embodiment, the first AE condition is defined to be satisfied when the following two conditions are both satisfied.

First Condition

The first condition is satisfied when the following relationship is satisfied in the immediately preceding AE control, that is, the difference between an exposure evaluation value and a target exposure value was large and an adjustment of 6% or more was made.

$$abs(1-Ek) > 0.06$$

Ek: exposure correction coefficient

Second Condition

The second condition is satisfied when the following relationship is satisfied, that is, substantially entire picture of the frame concerned is in a whiteout state or a blackout state.

$$(\text{average luminance value } aveY) > 250$$

or $$(\text{average luminance value } aveY) < 10$$

If the first AE conditions are satisfied (step S121: yes), the processor 9 determines that it is meaningless to assign a large code amount to the current picture. Therefore, at step S122 the processor 9 sets a code amount adjustment coefficient Fk to 0.8 and calculates a corrected target code amount T according to the following equation.

$$T = \text{(calculated target code amount } T_p \text{ or } T_b) \times F_k$$

Fk: code amount adjustment coefficient

Calculated target code amount: target code amount calculated for the frame concerned according to TM5

T: corrected target code amount

At step S132, the processor 9 resets the target code amount to be used actually to the corrected target code amount T. That is, the processor 9 adjusts the target code amount Tp or Tb that was calculated originally to a smaller target code amount, that is, performs the above-described processing B-2.

Figure 10:
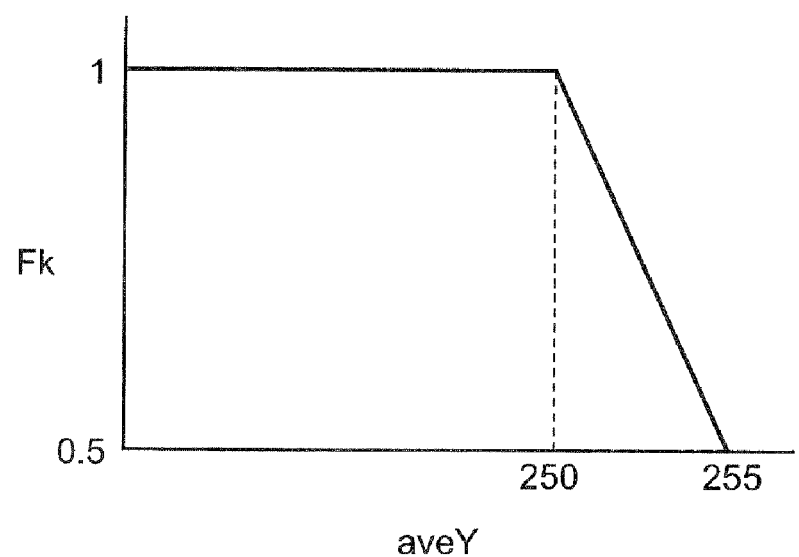
FIG. 10 is a graph showing how a code amount adjustment coefficient that is set for the picture of a frame that satisfies first AE conditions in a Tp/Tb resetting process is varied with the average luminance value.

Although at step S122 the code amount adjustment coefficient Fk which is used for calculating a corrected target code amount T is set at 0.8, it need not always be a fixed value. For example, as shown in FIG. 10, the code amount adjustment coefficient Fk may be varied with the average luminance value aveY according to a predetermined characteristic.

If the determination result of step S121 is "no," that is, the frame concerned does not satisfy the first AE conditions, at step S123 the processor 9 determines whether high-speed zooming was being performed at the time of capturing of the frame concerned. In this determination, an affirmative determination is made if the zoom key was manipulated continuously for more than a given time. If the determination result of step S123 is "yes" (under high-speed zooming), the processor 9 determines that the interframe prediction is inaccurate and the picture will be deteriorated to a large extent unless more codes are assigned. At step S124, the processor 9 sets the code amount adjustment coefficient Fk to 1.5 and calculates a corrected target code amount T according to the equation in the same manner as at step S122.

$$T = \text{(calculated target code amount } T_p \text{ or } T_b) \times F_k$$

Then, if the above-mentioned storage code amount Bank of the storage management buffer is larger than or equal to a code increase T−Tp or T−Tb of the corrected code amount T from the originally calculated target code amount Tp or Tb. If the storage code amount Bank is larger than or equal to the code increase T−Tp or T−Tb (step S126: yes), at step S132 the processor 9 resets the target code amount to be used actually to the corrected target code amount T. That is, the processor 9 adjusts the target code amount Tp or Tb that was calculated originally to a larger target code amount, that is, performs the above-described processing B-1. If the storage code amount Bank is smaller than the code increase T−Tp or T−Tb (step S126: no), the processor 9 sets the code amount adjustment coefficient to 1 at step S127 and finishes the Tp/Tb resetting process. The processor 9 thus performs the above-described processing B-6.

If the determination result of step S123 is "no" (i.e., the first AE conditions are not satisfied and high-speed zooming was not being performed), at step S125 the processor 9 determines whether the frame concerned satisfies second AE conditions. In the embodiment, the second AE condition is defined to be satisfied when the following two conditions are both satisfied.

First Condition

The first condition is satisfied when the following relationship is satisfied in the immediately preceding AE control, that is, the difference between an exposure evaluation value and a target exposure value was large and an adjustment of 6% or more was made.

$$abs(1 - E_k) > 0.06$$

Ek: exposure correction coefficient

Second Condition

The second condition is satisfied when the following relationship is satisfied, that is, the luminance level of the frame concerned is in an intermediate range and the picture includes sufficient image information. The intermediate range of the luminance level is set by 8-bit value in a range from 0 to 255.

$$70 < \text{(average luminance value ave} Y) < 180$$

If the second AE condition is satisfied (step S125: yes), the processor 9 determines that the interframe prediction is inaccurate and the picture will be deteriorated to a large extent due to a large and rapid luminance variation unless mode codes are assigned. Therefore, the processor 9 performs the same processing as in the case where high-speed zooming was being performed. That is, the processor 9 sets the code amount adjustment coefficient Fk to 1.5 and calculates a corrected target code amount T. And the processor 9 resets the target code amount to be used actually to the corrected target code amount T only if the storage code amount Bank of the storage management buffer is larger than or equal to a code amount increase.

In the embodiment, in the above-described first AE conditions and the second AE conditions, the threshold value of the adjustment width (luminance variation) of the exposure target value at the time of the immediately preceding AE control is 6%. However, this threshold value is merely an example and another value may be used.

On the other hand, if the determination result of step S125 is "no," that is, neither the first AE conditions nor the second AE conditions are satisfied, at step S128 the processor 9 sets the code amount adjustment coefficient Fk according to a residual difference SADR (i.e., an average value of SADs (sums of absolute differences) per one macroblock (intermacroblock)) of frame prediction done at the time of coding of the immediately preceding frame.

Figure 7:
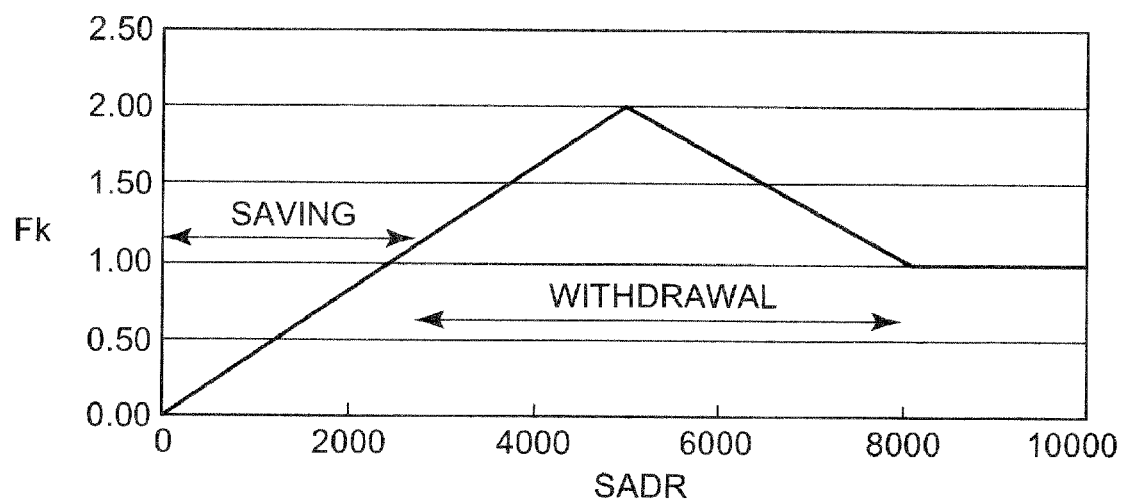
FIG. 7 is a graph showing a relationship between a code amount adjustment coefficient and SADR.

FIG. 7 is a graph showing a specific relationship between Fk and SADR, which is employed at step S128. The horizontal axis represents SADR and the vertical axis represents Fk. In the embodiment, as shown in FIG. 7, Fk is set smaller than 1 when SADR is smaller than 2,500. SADR being sufficiently small means a situation that the interframe prediction is sufficiently accurate and the preceding frame was coded with sufficient picture quality. Therefore, the processor 9 decreases the target code amount Tp, Tb of the frame concerned to leave a larger code amount for ensuing pictures.

When SADR is in a range of 2,500 to 8,000, Fk is set larger than 1. SADR being large means a situation that the interframe prediction is not sufficiently accurate and the picture quality of the preceding frame is low. Therefore, the processor 9 increases the target code amount T of the frame concerned to stop continuation of low-quality pictures. Although Fk is increased gradually in proportion to SADR until SADR reaches 5,000, Fk is decreased gradually in proportion to SADR in an SADR range being larger than 5,000 because no sufficient picture quality improving effect is obtained even if the target code amount is increased.

In an SADR range being larger than 8,000, Fk is set at 1. SADR being very large means a situation that the interframe prediction is totally inaccurate and the original picture itself is much less stationary as in a case of capturing of a fast-moving object. In such a situation, since an important part of a video image is not taken, picture quality improvement has no much merit visually even if deterioration is avoided by increasing the code amount. Therefore, the processor 9 maintains the originally calculated target code amount Tp, Tb.

In FIG. 7, in the SADR range of 5,000 to 8,000, Fk is decreased gradually in proportion to SADR. Alternatively, Fk may be fixed to 1 to maintain the originally calculated target code amount Tp, Tb in an SADR range being larger than 5,000.

Then, at step S129, as in the same manner as at steps S122 and S124, the processor 9 calculates a corrected target code amount T according to the following equation using the thus-set code amount adjustment coefficient Fk.

$$T = \text{(calculated target code amount } T_p \text{ or } T_b) \times F_k$$

Subsequently, if the thus-set code amount adjustment coefficient Fk is larger than 1 (step S130: yes), at step S132 the processor 9 resets the target code amount to be used actually to the corrected target code amount T only if the storage code amount Bank of the storage management buffer is larger than or equal to the code amount increase of the corrected target code amount T (step S126: yes). That is, also in this case, the processor 9 performs the above-described processing B-1.

If the code amount adjustment coefficient Fk that was set at step S128 is smaller than 1 (steps S130 and 131: no), at step S132 the processor 9 resets the target code amount to be used actually to the corrected target code amount T unconditionally. That is, also in this case, the processor 9 performs the above-described processing B-2. If the code amount adjustment coefficient Fk that was set at step S128 is equal to 1 (step S131: yes), the processor does not re-set the target code amount and finishes the Tp/Tb resetting process.

At step S128 of the above process, the code amount adjustment value Fk is set according to SADR. Alternatively, the code amount adjustment value Fk may be set according to a proportion of intra-macroblocks at the time of coding of the preceding frame or an average value of Qs (quantization code coefficients of respective macroblocks). That is, the target code amount of the frame concerned may be varied according to information other than SADR.

Upon completion of the rate control including the above-described Tp/Tb resetting, the processor 9 returns to the process of FIG. 2. At step S4, the processor 9 causes the encoder 8 to perform coding processing on a new frame using the target code amount Ti or T that has been re-set by the rate control.

If the determination result of step S6 is "no," that is, the frame that is to be coded is not an I picture (i.e., it is a P picture or a B picture), at step S7 the processor 9 performs a saving/withdrawal control before the rate control. FIG. 5 is a flowchart showing the details of the saving/withdrawal control.

In the saving/withdrawal control, first, at step S201, the processor 9 acquires an actually generated code amount of the P picture or B picture that was generated by the coding processing of step S4. At step S202, the processor 9 updates a residual target code amount Rest of the GOP by subtracting the actually generated code amount from it. Then, the processor 9 performs the following processing according to the code amount adjustment value Fk that was set by the above-described Tp/Tb resetting process (see FIG. 4).

If the code amount adjustment value Fk was set at a value that is smaller than 1 (step S203: yes), at step S206 the processor 9 performs the following saving processing on condition that the generated code amount obtained as a result of the frame coding is smaller than the re-set target code amount T and the storage code amount Bank of the storage management buffer is smaller than a given upper limit value Bankmax (steps S204 and S205: yes).

In the saving processing, the processor 9 adds, to the storage code amount Bank of the storage management buffer, as a surplus code amount, a code amount corresponding to a reduction of the target code amount according to the following equation using the code amount adjustment value Fk as a saving coefficient.

$$\text{Bank} = \text{Bank} + \text{Rest} \times (1 - F_k)$$

Furthermore, for the next frame coding, the processor 9 makes an adjustment of reducing the residual target code amount Rest of the GOP by the above surplus code amount. That is, the processor 9 performs the above-described pieces of processing B-3 and B-5.

Figure 8A:
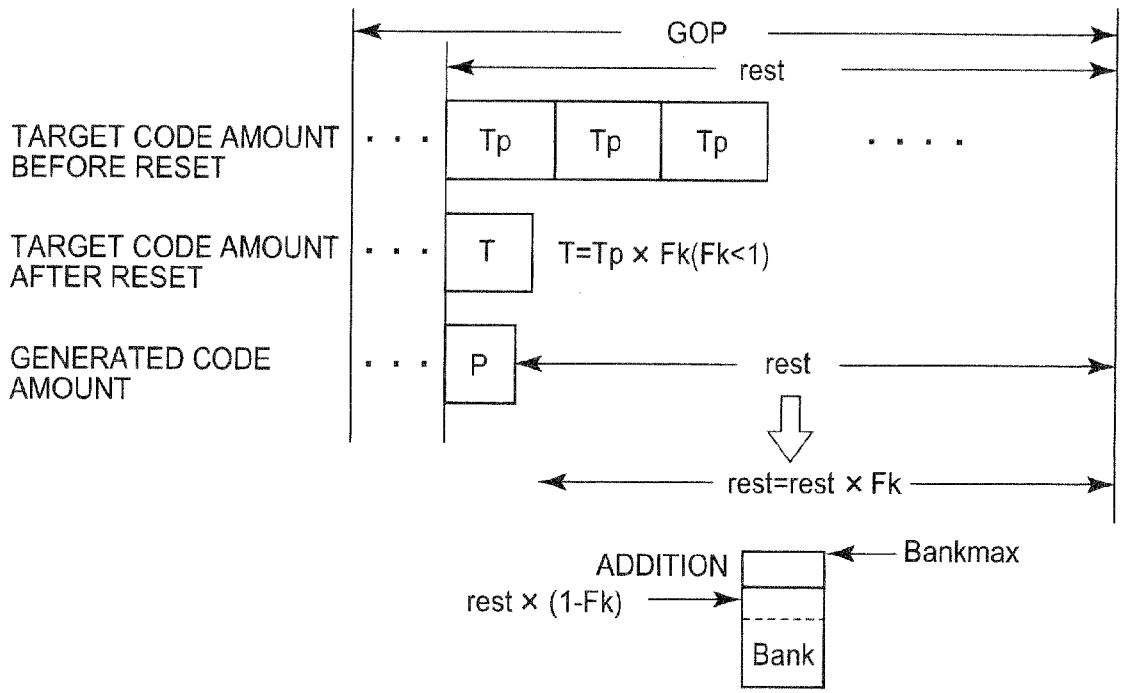
FIGS. 8A and 8B are charts showing saving processing and withdrawal processing, respectively.

FIG. 8A is a schematic chart showing the details of the saving processing. For example, when the code amount adjustment is coefficient Fk is equal to 0.9, 10% of the residual target code amount Rest of the GOP is saved (stored) in the storage management buffer and the residual target code amount Rest of the GOP is reduced to 90%.

Even if the code amount adjustment value Fk was set at a value that is smaller than 1 (step S203: yes), the saving/withdrawal control is finished immediately if the determination result of step S204 or S205 is "no," that is, the generated code amount obtained as a result of the frame coding is larger than or equal to the re-set target code amount T or the storage code amount Bank of the storage management buffer is larger than or equal to the upper limit value Bankmax. Although not shown in FIG. 5, even if the storage code amount Bank is smaller than the upper limit value Bankmax, the saving/withdrawal control is finished immediately if the free space of the storage management buffer is smaller than the above surplus code amount.

On the other hand, if the code amount adjustment value Fk was set at a value that is larger than 1 (step S203: no; step S207: yes), at step S208 the processor 9 performs the following withdrawal processing.

In the withdrawal processing, the processor 9 subtracts, from the storage code amount Bank of the storage management buffer, the code amount increase T−Tp or T−Tb of the corrected target code amount T that was used in the immediately preceding frame coding processing from the originally calculated target code amount Tp or Tb according to the following equation.

$$\text{Bank} = \text{Bank} - (T - T_p)$$

or $$\text{Bank} = \text{Bank} - (T - T_b)$$

That is, the processor 9 performs the above-described processing B-4.

Furthermore, for the next frame coding, the processor 9 makes an adjustment of subtracting the above code amount increase from the residual target code amount Rest of the GOP according to the following equation.

$$\text{Rest} = \text{Rest} - (T - T_p)$$

or $$\text{Rest} = \text{Rest} - (T - T_b)$$

Figure 8B:
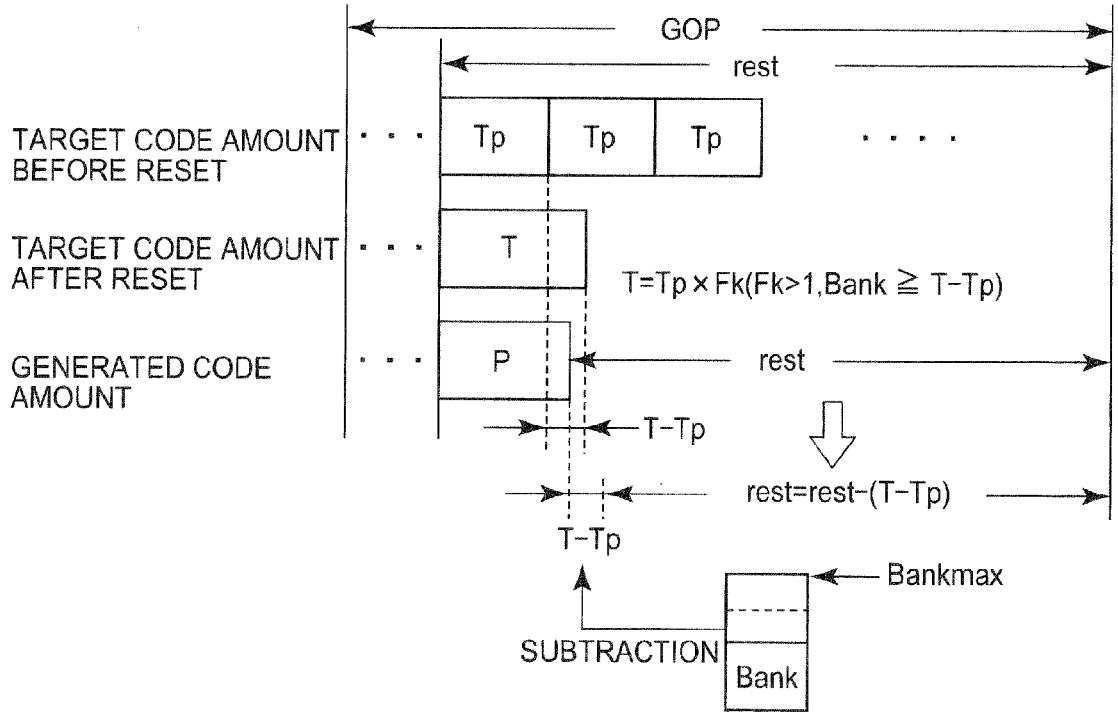

FIG. 8B is a schematic chart showing the details of the withdrawal processing.

Upon completion of the above saving/withdrawal control, at step S8 the processor 9 sets a target code amount again by the above-described rate control. In doing so, if it is necessary to increase a target code amount Tp or Tb that was determined for a P picture or a B picture according to TM5, the target code amount Tp or Tb is increased within the storage code amount of the saving management buffer as updated by the saving/withdrawal control. Subsequently, steps S4-S8 are performed repeatedly.

As described above, in the embodiment, basic target code amounts are determined by the CBR on a frame-by-frame basis. As for P pictures and B pictures, if a P picture or a B picture can be determined such that its picture quality is not improved even if a large code amount is assigned to it, the target code amount Tp or Tb is reduced so that a larger code amount can be assigned to ensuing P pictures or B pictures in the GOP. This makes it possible to improve the picture quality of the ensuing pictures. If the P picture or B picture can be determined such that it is preferable to assign a larger code amount to it, the target code amount Tp or Tb is increased, whereby picture deterioration can be prevented.

As for I pictures, an upper limit is set for the target code amount of an I picture, whereby the ratios of code amount allocation to P pictures and B pictures in the GOP are increased. This also contributes to improving the picture quality.

A reduction of the target code amount Tp or Tb of a P picture or a B picture is saved in the storage management buffer as a surplus code amount and an increase of the target code amount Tp or Tb is withdrawn from the storage management buffer. On the other hand, an upper limit is set for the storage management buffer and the target code amount Tp or Tb is increased on condition that a code amount that is equal to the increase is stored in the storage management buffer. This makes it possible to keep the bitrate of a GOP approximately constant.

Therefore, when a video image is captured, the image quality of the video image can be increased without undue increase of the amount of video data recorded in the memory 14 whereas a residual recordable time is left.

In the embodiment, when a P picture or a B picture as a subject of coding is a picture that is small in information amount due to white saturation or the like (i.e., the first AE conditions are satisfied), the P picture or B picture is determined such that its picture quality is not improved even if it is assigned a large code amount, that is, its target code amount Tp or Tb should be reduced. When a P picture or a B picture is a picture that is large in information amount due to a zoom operation or due to an AE control (i.e., the second AE conditions are satisfied), the P picture or B picture is determined such that it is preferable to assign a larger code amount to it, that is, its target code amount Tp or Tb should be increased. That is, whether a P picture or a B picture is such that its target code amount Tp or Tb should be reduced or increased is determined on the basis of plural kinds of information.

In this manner, whether a P picture or a B picture is a picture for which its target code amount Tp or Tb should be reduced or increased can be determined properly, whereby the image quality of a video image can be improved more reliably.

The code amount adjustment coefficient Fk is determined on the basis of the SADR value of the frame that immediately precedes a P picture or a B picture as a subject of coding, that is, according to the picture quality or the like of the immediately preceding frame. The target code amount Tp or Tb is increased or decreased (corrected) by using the code amount adjustment coefficient Fk.

Therefore, whether a P picture or a B picture is a picture for which its target code amount Tp or Tb should be reduced or increased can be determined closely. The target code amount Tp or Tb is increased or decreased (corrected) closely according to a result of that determination. This also contributes to increasing the image quality of a video image more reliably.

In limiting the target code amount of an I picture, if the I picture is a picture that lacks high-frequency components due to the integration effect of a pan or tilt and is small in information amount, a second limit value Tlmax2 which is smaller than a first limit value Tlmax1 which is set unconditionally is set as an upper limit target code amount. If the I picture that was taken under a white-saturated exposure control, a third limit value Tlmax3 corresponding to an average luminance value of all pixels of the frame concerned is set.

Therefore, the code amount (generated code amount) of an I picture can be reduced as much as possible in such a range that no breathing problem will occur. This also contributes to increasing the image quality of a video image more reliably.

In the embodiment, after frame coding of a P picture or a B picture whose target code amount Tp or Tb was reduced (corrected), in the saving processing (step S206 in FIG. 5) of the saving/withdrawal control, the following calculations are performed, whereby a surplus code amount corresponding to the reduction of the target code amount Tp or Tb is saved in the storage management buffer.

$$Bank=Bank+Rest \times (1-Fk)$$

$$Rest=Rest \times Fk$$

More specifically, a code amount that is a residual target code amount Rest of the GOP multiplied by a reduction factor of the target code amount Tp or Tb, that is, a code amount that is larger than the actual reduction of the target code amount Tp or Tb and that increases as the number of residual pictures of the GOP increases (i.e., as the picture position comes closer to the head of the GOP) even if the code amount adjustment coefficient Fk remains the same. Furthermore, the residual target code amount Rest of the GOP for coding of the next frame is adjusted accordingly. Alternatively, the saving processing may be as follows.

Parameter "rest1pic" may be introduced as follows as a parameter representing a residual target code amount per picture.

$$rest1pic=Rest/(\text{number of residual pictures of GOP})$$

$$Bank=Bank+rest1pic \times (1-Fk)$$

$$Rest=Rest-rest1pic \times (1-Fk)$$

Accordingly, a surplus code amount corresponding to a reduction of the target code amount Tp or Tb may be set as a code amount that is a residual target code amount per picture multiplied by a reduction factor of the target code amount Tp or Tb, that is, a code amount that is irrelevant to the number of residual pictures of the GOP and conforms to the reduction of the target code amount Tp or Tb (i.e., a saved code amount). And an adjustment may be made by subtracting that code amount from the residual target code amount Rest of the GOP. Although a detailed description will not be made, the inventors have confirmed by an experiment that the saving processing of the embodiment provides better image deterioration preventing effect in the case of a long sequence.

In the embodiment, after frame coding of a P picture or a B picture whose target code amount Tp or Tb was increased (corrected), in the withdrawal processing (step S208 in FIG. 5) of the saving/withdrawal control, the following calculations are performed.

$$Bank=Bank-(T-Tp)$$

$$Rest=Rest-(T-Tp)$$

or $$\text{Bank} = \text{Bank} - (T - Tb)$$

$$\text{Rest} = \text{Rest} - (T - Tb)$$

Accordingly, a code amount that is equal to the increase of the target code amount Tp or Tb is subtracted from the storage code amount Bank of the storage management buffer and the residual target code amount Rest of the GOP for coding of the next frame is adjusted accordingly. Alternatively, for example, the difference between the target code amount Tp or Tb and a generated code amount P or B obtained as a result of the frame coding may be subtracted from the storage code amount Bank of the storage management buffer according to the following calculations.

$$\text{Bank} = \text{Bank} - (P - Tp)$$

$$\text{Rest} = \text{Rest} - (P - Tp)$$

or $$\text{Bank} = \text{Bank} - (B - Tb)$$

$$\text{Rest} = \text{Rest} - (B - Tb)$$

In the embodiment only when the target code amount Tp or Tb of a P picture or a B picture is reduced (corrected), a code amount corresponding to the reduction is saved in the storage management buffer. Alternatively, a reduction of the target code amount Ti of an I picture that occurred when the target code amount Ti was limited to a given limit value in the above-described rate control (see FIG. 3) may also be saved in the storage management buffer.

The rate control may be performed as such that only the target code amounts Tp and Tb of a P picture and a B picture are increased or decreased (corrected) and the target code amount Ti of an I picture as calculated according to TM5 is always used as it is. Furthermore, where a video image is compression-coded according to MPEG in which case P pictures are usually largest in number among pictures of the three types in each GOP, the target code amount Tp of only a P picture may be increased or decreased (corrected). A saving/withdrawal control is performed accordingly. In either case, when a video image is captured, the image quality of a video image can be improved without unduly increasing the amount of video data recorded in the memory 14 whereas a residual recordable time is left. However, the embodiment is preferable in terms of improvement of the image quality of a video image.

The specific method for determining the correction coefficient Fk in adjusting the target code amount Tp or Tb in the above-described Tp/Tb resetting process (see FIG. 4) is not limited to the one described in the embodiment but can be modified as appropriate as appropriate. In the embodiment, the correction coefficient Fk is determined on the basis of image information such as an average luminance value aveY of all pixels or SADR of the immediately preceding frame or environmental information such as an exposure correction coefficient Ek at the time of an AE control or execution/non-execution of high-speed zooming. Alternatively, the correction coefficient Fk may be determined on the basis of other image information or environmental information.

The specific method for determining the upper limit value in limiting the target code amount Ti of an I picture in the above-described rate control (see FIG. 3) is not limited to the one described in the embodiment but can be modified as appropriate as appropriate. In the embodiment, the upper limit value is determined on the basis of an average luminance value aveY of all pixels, an exposure correction coefficient Ek at the time of an AE control, or a camera movement speed CAMmov which is environmental information. Alternatively, the upper limit value may be determined on the basis of other image information or environmental information. Furthermore, for example, a camera movement speed CAMmov may be acquired from an activity (act(j)) at the time of coding of the immediately preceding frame or a camera shake amount (in a configuration that is provided with an acceleration sensor for camera shake detection) rather than a motion vector obtained at the time of coding of the immediately preceding frame.

In the embodiment, the storage management buffer is made empty when it is initialized in a rate control on an I picture (head picture of a GOP). Alternatively, the storage code amount Bank may be set to a given code amount in advance. In this case, in a Tp/Tb resetting process for an arbitrary frame, the target code amount Tp or Tb may be increased beyond the current storage code amount of the storage management buffer with the above given code amount as an upper limit. Or the target code amount Tp or Tb may be increased even in the case where the target code amount Tp or Tb has not been decreased (corrected), that is, no code amount has been saved, so far. That is, increase correction of the target code amount Tp or Tb which is accompanied by borrowing of a code amount within the above given code amount may be permitted.

In this case, as appropriate, larger code amounts can be assigned to P pictures or B pictures that are close to the head of the GOP. That is, deterioration of their picture quality can be prevented even if they have large information amounts. Naturally, the recording time of the moving picture is shortened because the maximum bitrate of each GOP is increased by the above given code amount, that is, the initial value of the storage code amount Bank. However, the bitrate of a GOP can be made approximately constant as in the embodiment and a residual recordable recording can be left.

For example, increase correction of the target code amount Tp or Tb which is accompanied by borrowing of a code amount within the above given code amount may be enabled by withdrawing, from the storage management buffer, a code amount that exceeds the storage code amount Bank of the storage management buffer, is within a given limit amount, and is suitable for the increase of the target code amount Tp or Tb. That is, an event that the storage code amount Bank becomes negative within the above given code amount may be permitted.

More specifically, the processor 9 may be configured to perform a process serving as a excess withdrawing module. If in a Tp/Tb resetting process the processor 9 determines that a P picture or a B picture of a processing subject frame is a picture whose target code amount Tp or Tb should be increased (Fk>1) and if an increase of the target code amount Tp or Tb exceeds the storage code amount Bank of the storage management buffer, the processor 9 determines whether the surplus (resulting in a negative storage code amount) is smaller than or equal to a predetermined, given code amount. The processor 9 increases (adjusts) the target code amount Tp or Tb if the surplus is smaller than or equal to the given code amount, and stops the increase correction if the surplus exceeds the given code amount. Alternatively, the processor 9 sequentially adds surpluses to the storage code amount Bank as negative amounts, and increases (adjusts) the target code amount Tp or Tb on condition that the negative amount is smaller than a predetermined, given code amount.

This also prevents deterioration of the image quality even if P pictures or B pictures that are close to the head of a GOP have large information amounts as well as to leave a residual recordable time by keeping the bitrate of a GOP approximately constant.

Although the above embodiment is described as an example of the digital video camera to which the present invention is employed, the present invention not limited to the embodiment described in the above. For example, the present invention can also be employed to other digital video recorder having a video image capturing function such as digital cameras and camera devices incorporated in other information apparatuses such as cell phones.

Furthermore, the present invention may be employed to an apparatus which is not capable of capturing video image. For example, the present invention may also be applied to other digital video recorder such as digital TV receivers, DVD recorders and hard disk recorders, and personal computers.

It is to be understood that the present invention is not limited to the specific embodiment described in the above and that the invention can be embodied with the components modified without departing from the spirit and scope of the invention. The invention can be embodied in various forms according to appropriate combinations of the components disclosed in the embodiment described above. For example, some components may be deleted from all components shown in the embodiment. Further, the components in different configurations may be used appropriately in combination.

What is claimed is:

1. A code amount control device for controlling code amounts obtained as a result of compression coding in performing a compression coding on a moving image, the device comprising:
    a setting section configured to set, for each frame, a target code amount for maintaining a generated code amount per unit time of an image group configured by a plurality of frames as a target code amount to be used when performing the compression coding on an image of each frame;
    a correcting section configured to correct the target code amount set by the setting section based on predetermined information;
    a prohibiting section configured to prohibit the correcting section from performing an increasing correction operation of the target code amount based on the predetermined information in a case in which an incremental code amount by the correction exceeds a stored code amount of a virtual storage management buffer;
    a storage amount managing section configured to add a code amount corresponding to a reduction of the target code amount obtained by the correction by the correcting section to the stored code amount of the storage management buffer while having a predetermined storage amount as a limit, and to subtract a code amount corresponding to an increase of the target code amount obtained by the correction by the correcting section from the stored code amount of the storage management buffer; and
    a coding section configured to perform compression coding on an image of each frame in accordance with the target code amount corrected by the correcting section,
    wherein the storage amount managing section adds a code amount, as the code amount corresponding to the reduction of the target code amount obtained by the correction by the correcting section, to the stored code amount of the storage management buffer, the code amount being obtained by subtracting, from an assigned code amount that is assigned to all remaining images of the image group after performing the compression coding by the coding section based on the corrected target code amount, a code amount obtained by multiplying a reduction rate to the assigned code amount, the reduction rate being a rate of the corrected target code amount with respect to the target code amount before the correction.

2. The code amount control device according to claim 1, wherein the correcting section increases or decreases the target code amount by determining a correction coefficient based on the predetermined information and multiplying the target code amount set by the setting section by the determined correction coefficient.

3. The code amount control device according to claim 2, wherein the correcting section comprises:
    a determination section configured to determine based on the predetermined information whether the image as a subject of compression coding is such that its code amount should be increased or reduced; and
    a correction coefficient setting section configured to set the correction coefficient to a predetermined correction coefficient for code amount increase if the determination section determines that the image as the subject of compression coding is such that its code amount should be increased, and to set the correction coefficient to a predetermined correction coefficient for code amount reduction if the determination section determines that the image as the subject of compression coding is such that its code amount should be reduced.

4. The code amount control device according to claim 3, wherein the determination section determines based on a plurality of predetermined pieces of information whether the image as a subject of compression coding is such that its code amount should be increased or reduced.

5. The code amount control device according to claim 1, wherein the predetermined information, based on which the correcting section corrects the target code amount set by the setting section, comprises image information relating to the image of a subject frame.

6. The code amount control device according to claim 1, wherein the predetermined information, based on which the correcting section corrects the target code amount set by the setting section, comprises environmental information indicating an environment in which the image of a subject frame is acquired.

7. The code amount control device according to claim 1, wherein the coding section performs the compression coding on an image of each frame into an intraframe coded image or an interframe prediction coded image by a coding method using a motion-compensated interframe prediction technique, and
    wherein the correcting section corrects, based on the predetermined information, a target code amount that is set by the setting section for the interframe prediction coded image.

8. The code amount control device according to claim 7, wherein the predetermined information, based on which the correcting section corrects the target code amount set by the setting section, comprises a residual difference of interframe prediction done at the time of the compression coding of an image of an immediately preceding frame by the coding section.

9. The code amount control device according to claim 7, wherein the correcting section comprises a limiting section configured to correct the target code amount set by the setting section for the intraframe coded image to a predetermined upper limit code amount if the target code amount set by the setting section exceeds the predetermined upper limit code amount.

10. The code amount control device according to claim 9, wherein the correcting section comprises an upper limit setting section configured to set the upper limit code amount of the target code amount for the intraframe coded image based on predetermined information.

11. The code amount control device according to claim 10, wherein the predetermined information, based on which the upper limit setting section sets the upper limit code amount, comprises image information relating to the image of a subject frame.

12. The code amount control device according to claim 10, wherein the predetermined information, based on which the upper limit setting section sets the upper limit code amount, comprises environmental information indicating an environment in which the image of a subject frame was acquired.

13. The code amount control device according to claim 7, wherein the storage amount managing section exclusively adds a code amount corresponding to a reduction of the target code amount for the interframe prediction coded image obtained by the correction of the correcting section to the stored code amount of the storage management buffer while having a predetermined storage amount as an upper limit, and subtracts a code amount corresponding to an increase of the target code amount for the interframe prediction coded image obtained by the correction of the correcting section from the stored code amount of the storage management buffer, and
wherein the prohibiting section controls the correction by the correcting section to increase the target code amount for the interframe prediction coded image, and limits an increase of the target code amount for the interframe prediction coded image obtained by the correction of the correcting section to the storage code amount of the storage management buffer.

14. A code amount control method comprising:
setting, for each frame, a target code amount for maintaining a generated code amount per unit time of an image group configured by a plurality of frames as a target code amount to be used when compression coding is performed on an image for each frame in performing the compression coding on a moving image;
correcting the set target code amount based on predetermined information;
prohibiting performing of the correction when a code amount corresponding to an increment of the target code amount by the correction exceeds a stored code amount of a virtual storage management buffer;
adding, when the target code amount is reduced by the correction, a code amount corresponding to a reduction of the target code amount obtained by the correction, to the stored code amount of the storage management buffer, the code amount being obtained by subtracting, from an assigned code amount that is assigned to all remaining images of the image group after performing the compression coding based on the corrected target code amount, a code amount obtained by multiplying a reduction rate to the assigned code amount, the reduction rate being a rate of the corrected target code amount with respect to the target code amount before the correction;
subtracting, when the target code amount is increased by the correction, a code amount corresponding to an increase of the target code amount obtained by the correction from the stored code amount of the storage management buffer; and
performing the compression coding on the image for each frame based on the corrected target code amount.

15. A non-transitory computer-readable storage medium storing a program executable by a computer system to control the computer system to perform functions comprising:
setting, for each frame, a target code amount for maintaining a generated code amount per unit time of an image group configured by a plurality of frames as a target code amount to be used when compression coding is performed on an image for each frame in performing the compression coding on a moving image;
correcting the set target code amount based on predetermined information;
prohibiting performing of the correction when a code amount corresponding to an increment of the target code amount by the correction exceeds a stored code amount of a virtual storage management buffer;
adding, when the target code amount is reduced by the correction, a code amount corresponding to a reduction of the target code amount obtained by the correction, to the stored code amount of the storage management buffer, the code amount being obtained by subtracting, from an assigned code amount that is assigned to all remaining images of the image group after performing the compression coding based on the corrected target code amount, a code amount obtained by multiplying a reduction rate to the assigned code amount, the reduction rate being a rate of the corrected target code amount with respect to the target code amount before the correction;
subtracting, when the target code amount is increased by the correction, a code amount corresponding to an increase of the target code amount obtained by the correction from the stored code amount of the storage management buffer; and
performing the compression coding on the image for each frame based on the corrected target code amount.

16. A video recording apparatus comprising:
an imaging section that captures a moving image;
a setting section configured to set, for each frame, a target code amount for maintaining a generated code amount per unit time of an image group configured by a plurality of frames as a target code amount to be used when performing the compression coding on an image of each frame of the moving image captured by the imaging section;
a correcting section configured to correct the target code amount set by the setting section based on predetermined information;
a prohibiting section configured to prohibit the correcting section from performing an increasing correction operation of the target code amount based on the predetermined information in a case in which an incremental code amount by the correction exceeds a stored code amount of a virtual storage management buffer;
a storage amount managing section configured to add a code amount corresponding to a reduction of the target code amount obtained by the correction by the correcting section to the stored code amount of the storage management buffer while having a predetermined storage amount as a limit, and to subtract a code amount corresponding to an increase of the target code amount obtained by the correction by the correcting section from the stored code amount of the storage management buffer;
a coding section configured to perform compression coding on an image of each frame of the moving image captured by the imaging section in accordance with the target code amount corrected by the correcting section; and a storage section configured to store the moving image on which the compression coding is performed by the coding section, wherein the storage amount managing section adds a code amount, as the code amount corresponding to the reduction of the target code amount obtained by the correction by the correcting section, to the stored code amount of the storage management buffer, the code amount being obtained by subtracting, from an assigned code amount that is assigned to all remaining images of the image group after performing the compression coding by the coding section based on the corrected target code amount, a code amount obtained by multiplying a reduction rate to the assigned code amount, the reduction rate being a rate of the corrected target code amount with respect to the target code amount before the correction.

* * * * *